(12) United States Patent
Alig (10) Patent No.: US 10,611,584 B2
(45) Date of Patent: Apr. 7, 2020

(54) METHOD AND DEVICE FOR GROUPING PRODUCT BLANKS

(71) Applicant: TEXA AG, Haldenstein (CH)

(72) Inventor: Lukas Alig, Chur (CH)

(73) Assignee: Texa AG, Haldenstein (CH)

( * ) Notice: Subject to any disclaimer, the term of this patent is extended or adjusted under 35 U.S.C. 154(b) by 0 days.

(21) Appl. No.: 16/076,391

(22) PCT Filed: Jan. 31, 2017

(86) PCT No.: PCT/EP2017/052069
§ 371 (c)(1),
(2) Date: Aug. 8, 2018

(87) PCT Pub. No.: WO2017/137283
PCT Pub. Date: Aug. 17, 2017

(65) Prior Publication Data
US 2019/0055095 A1    Feb. 21, 2019

(30) Foreign Application Priority Data

Feb. 8, 2016    (DE) .................. 10 2016 102 170

(51) Int. Cl.
*B65G 65/00*    (2006.01)
*B65B 35/40*    (2006.01)
(Continued)

(52) U.S. Cl.
CPC ............ *B65G 65/00* (2013.01); *B65B 35/405* (2013.01); *B65B 43/54* (2013.01); *B65B 19/34* (2013.01); *B65G 2201/0252* (2013.01)

(58) Field of Classification Search
CPC ......... B65G 65/00; B65B 5/106; B65B 35/30; B65B 5/06; B65B 35/405
(Continued)

(56) References Cited

U.S. PATENT DOCUMENTS

| 5,339,606 A | * | 8/1994 | Benz ..................... B65B 5/106 |
| | | | 53/150 |
| 5,704,195 A | * | 1/1998 | Benz ..................... B65B 5/08 |
| | | | 53/148 |

FOREIGN PATENT DOCUMENTS

| DE | 3835058 A1 | 4/1990 |
| DE | 102004026612 A1 | 1/2006 |

(Continued)

OTHER PUBLICATIONS

International search report for patent Apln. No. PCT/EP2017/052069 dated Apr. 20, 2017.

*Primary Examiner* — Gene O Crawford
*Assistant Examiner* — Lester Rushin, III
(74) *Attorney, Agent, or Firm* — Bachman & LaPointe, PC (57) ABSTRACT

The invention relates to a method for grouping preferably empty long products (4) embodied as tins, tubes or cartridges, the products (4) being delivered by a delivering conveyor device (5), preferably from a production line for producing the products (4), and placed on a conveyer belt (3) and transported thereby at a conveying speed along a conveying section (S) in a conveying direction (F), a product group (P) comprising a plurality of the products (4) being transferred by transfer means (7) at the same time from the conveyor belt (3) into receiving means (6), the transfer means (7) for transferring the products (4) being moved during the movement with the product group (P) in the conveying direction (F) at an angle, particularly perpendicularly, to the conveying direction (F) in a transfer direction (T) towards the receiving means (6), the receiving means (6) being moved perpendicularly to the conveying direction (F) and perpendicularly to the transfer direction (T), in order to be able to receive the subsequent product groups (P) above or below the already transferred product groups (P), after the (Continued)

transfer of each product group (P) or after the transfer of a plurality of product groups (P). The receiving means (6) and the transfer means (7) are moved along the conveying section (S) in the conveying direction (F) during the transfer of the product group (P), particularly synchronously with the conveyor belt (3) and the product groups (P) conveyed thereon and to be passed on, and following a successful transfer, are moved along the conveying section (S), in the opposite direction to the conveying direction (F), in order to transfer another product group (P') into the receiving means (6).

14 Claims, 8 Drawing Sheets

(51) Int. Cl.
*B65B 43/54* (2006.01)
*B65B 19/34* (2006.01)

(58) Field of Classification Search
USPC .......................................................... 198/617
See application file for complete search history.

(56) References Cited

FOREIGN PATENT DOCUMENTS

| EP | 1114784 A1 | 7/2001 |
| EP | 2690189 A1 | 1/2014 |
| FR | 2391126 A1 | 12/1978 |
| WO | 9742109 A1 | 11/1997 |
| WO | 2005019035 A1 | 3/2005 |
| WO | 012121762 A1 | 9/2012 |

\* cited by examiner

METHOD AND DEVICE FOR GROUPING PRODUCT BLANKS

BACKGROUND OF THE INVENTION

The invention relates to a method for grouping in particular empty oblong products in the form of cans, tubes or cartridges, the preferably cylindrical products being delivered by a delivering conveyor, preferably from a production line for producing the products, and placed on a conveyor belt (transport belt) and conveyed by it at a conveying speed along a conveying section in a conveying direction, a group of products comprising several of the products being simultaneously transferred from the conveyor belt into receiving means, such as a pin plate, or immediately into an outer packaging by transfer means, said transfer means being displaced toward the receiving means in a transfer direction at an angle, in particular perpendicular to the conveying direction so as to transfer the products while moving with the group of products in the conveying direction, and the receiving means being displaced perpendicular to the conveying direction and perpendicular to the transfer direction (i.e. preferably along a vertical axis) after each transfer of a group of products or after the transfer of multiple groups of products so as to be able to receive or receive the next group of products above or below the groups of products already transferred.

Furthermore, the invention relates to a grouping device for grouping products in the form of cans, tubes or cartridges, the grouping device being configured to carry out the method according to the invention. The device comprises a delivering conveyor for the aforementioned products, a circulating conveyor belt (circulating transport belt) for conveying the products along a conveying section in a conveying direction, transfer means for transferring a group of products from the conveyor belt into receiving means, drive means, and control means for controlling the drive means. The drive means are drive means for driving the conveyor at a conveying speed and for driving the transfer means and the receiving means, preferably comprising multiple drives, such as at least one electric motor, preferably a servomotor and/or at least one pneumatic drive and/or at least one hydraulic drive. It is conceivable for at least two of the functional units to be driven (conveyor belt, receiving means and transfer means) to be driven by a shared drive. If required, the control means also control a drive for driving the delivering conveyor.

Moreover, the invention comprises a system which is a production installation in this case, comprising a grouping device according to the invention and a production device for producing the products to be grouped, which supplies the delivering conveyor with the products to be grouped.

Grouping devices for grouping typically substantially cylindrical product units, such as empty cans, tubes or cartridges, are known in various designs. The product category of cartridges refers to substantially cylindrical containers, such as for silicone or acrylic, which are provided with a cartridge bottom that can be slid into a sleeve in order to be able to push out the content of the cartridge (using a so-called gun, in particular a silicone gun) through an outlet located axially opposite the bottom. The empty products typically come from a production device on which they are produced, and the object is to gather, in particular package, the products in relatively large units and to transport them to filling plants. In order to assembling these units, the products are typically grouped, wherein, in the simplest case, a grouped group of products constitutes an aforementioned unit; typically, several groups of products of this kind are gathered in an aforementioned unit.

From FR-A-2 391 126, for example, a device for grouping continuously delivered products coming from a production line or production device is known. The products are grouped using the known device, in which two conveying units that work in a manner trailing each other are controlled in such a manner that one of the conveying units is fed while the other one is moved to a discharging station, where it is emptied. The structure is relatively complex and the amount of space required is large. Moreover, the working speed (cycle rate) very limited.

A grouping device described in U.S. Pat. No. 5,339,606 works in a similar manner. Contrary to the device described above, the transfer to a conveying and grouping unit is continuous and happens in one place only. The known device can operate at a significantly higher cycle rate than the device described in FR-A-2 391 126; however, the work required to retool the device when the diameter of the products changes is disadvantageous. This point of criticism also applies to the device known from U.S. Pat. No. 5,704,195.

A significantly improved grouping device is described in EP 1 114 784 B1, in which the products are not directly placed on a conveyor belt from a suspended-vessel belt. A flexible belt section for temporary placement of the products is located between the suspended-vessel belt and the conveyor belt, the flexible belt section, the discharging conveyor belt and the delivering suspended-vessel belt having a shared transfer section. After placement of a settable number of products to be gathered in a group on the flexible belt, the flexible belt is moved backward, whereby the products are transferred to the conveyor belt. During the transfer of the group of products from the conveyor belt to the receiving means, the conveyor belt is standing still and the group of products is shifted into the receiving means perpendicular to the conveying direction of the conveyor belt by a purely translational movement of the transfer means, which comprise a pusher. After placement of the products, the flexible belt is moved back into a starting position at high speed, during which it has to overtake the delivering suspended-vessel belt and the conveyor belt. This may lead to unsmooth transport due to high positive and negative acceleration when large product diameters coincide with a high cycle rate of the delivering suspended-vessel belt.

From WO 2012/121762 A1, which does not pertain to this field, a method for transferring bottles into cardboard boxes is known, the cardboard boxes being provided on a conveyor belt which conveys the filled cardboard boxes in a straight line. The bottles can be transferred from a conveying belt of a conveyor into the cardboard boxes perpendicular to the conveying direction by means of a pusher.

From EP 2 960 189 A1, a device and a method for packaging tubes is known, wherein with the aid of pushers that are stationary with respect to a conveying direction of a conveyor belt, tube bodies are first pushed onto two distributing-plate halves of a distributing plate, which then are moved relative to each other, whereupon the tube bodies are shifted further onto height-adjustable grouping plates by means of stationary pushers.

From DE 10 2004 026 612 A1, a device for forming stacks from packaged goods and for transferring the packaged goods into a packaged-goods transporting system is known, which does not pertain to this field.

SUMMARY OF THE INVENTION

Based on the aforementioned state of the art, therefore, the object of the invention is to provide a grouping method and a device for carrying out such a method which ensure that products in the form of cans tubes or cartridges can be grouped smoothly and failure-free even at high cycle rates of a delivering conveyor, wherein the grouping device is to be characterized by a simple structure and little retooling times in the case of a change in diameter of the products to be grouped.

With regard to the method, this object is attained by the features discussed herein, i.e., in the case of a generic method, by the fact that during the transfer of the group of products (from the conveyor belt into the receiving means), both the receiving means and the transfer means are displaced along the conveying section in the conveying direction, in particular synchronously with the conveyor belt and the group of products to be transferred conveyed thereon, and, once the transfer is complete, are displaced back along the conveying section against the conveying direction in order to transfer another group of products into the receiving means.

With regard to the grouping device, the object is attained by the features discussed herein, i.e., in the case of a generic grouping device, by the fact that the control means are configured to control the drive means in such a manner that during the transfer of the group of products, both the receiving means and the transfer means are displaced along the conveying section in the conveying direction, in particular synchronously with the conveyor belt and the group of products to be transferred conveyed thereon, and, after the transfer is complete, are displaced back along the conveying section against the conveying direction in order to transfer another group of products into the receiving means.

Advantageous embodiments of the invention are disclosed in the dependent claims. Any and all combinations of at least two of the features disclosed in the description, in the claims and/or in the figures shall fall within the scope of the invention.

To avoid redundancies, features disclosed in accordance with the method shall be deemed disclosed and claimable in accordance with the device. Likewise, features disclosed in accordance with the device shall be deemed disclosed and claimable in accordance with the method.

The invention is based on the idea that both the receiving means and the transfer means are disposed so as to be displaceable along the conveying section and receiving means and transfer means are displaced from the conveyor belt into the receiving means along the conveying section in the conveying direction during the transfer of the group of products. Preferably, the transfer means undergo a combined movement both in the conveying direction and perpendicular thereto in the direction of the receiving means so as to transfer the group of products to them. Once the transfer of the group of products to the receiving means is complete, the receiving means and the transfer means are displaced against the conveying direction along the conveying section so as to be subsequently displaced in the conveying direction again together with the conveyor belt and with the next group of products in order to transfer the next group of products. This process will be repeated over and over. Owing to the displacing movement of both the receiving means and the transfer means together with the group of products to be transferred in the conveying direction, the conveyor belt does not have to be stopped and its speed does not have to be reduced in order to transfer the group of products, whereby positive and negative acceleration (accelerating and decelerating) of the conveyor belt can be avoided. By applying the grouping method according to the invention and by using the grouping devices according to the invention, any temporary storages ahead of the conveyor belt, in particular roll storages having displaceable deflection rollers such as those that have to be used in the state of the art, can be omitted.

According to the invention, it is envisaged that the receiving means are or can be controlled in such a manner that after each completed transfer of a group of products or after the transfer of multiple groups of products, they are displaced both perpendicular to the conveying direction and perpendicular to the transfer direction in order to be able to receive the next group of products above or below the groups of products already transferred.

Additionally, the invention makes possible an embodiment of the invention which will be explained later and according to which the products are transferred directly, in particular one after the other, from the delivering conveyor to the conveyor belt, which is preferably realized as a pocket belt, instead of having to be temporarily stored first in a temporary storage, such as a flexible belt as described in the state of the art, whereby a smooth and reliable product flow can be ensured overall. It is possible and preferred, in particular, that the conveyor is operated continuously at a preferably constant speed which has a fixed ratio to the speed of the delivering conveyor, i.e. at a speed that allows products to be taken over one after the other directly from the delivering conveyor. The speed of the conveyor belt is preferably harmonized with the speed of the delivering conveyor in such a manner that a product position of a product on the delivering conveyor always coincides with the next free product receiving position on the conveyor belt.

Preferably, the displacing movement of the transfer means and of the receiving means in the conveying direction is straight parallel to the group of products to be transferred, i.e. it is a translational displacing movement, on which, in the case of the transfer means, another, in particular translational, (transfer) displacing movement in a transfer direction perpendicular to the conveying direction toward the receiving means is superimposed.

In particular, the receiving means are not a conveyor belt. Preferably, the receiving means are displaceable along the conveying direction in a reciprocating manner and perpendicular thereto or, alternatively, along two displacement axes disposed at an angle to each other, in particular perpendicular to each other, by means of a robot arm, one of the displacement axes preferably running along or parallel to the conveying direction and the other one running perpendicular in a vertical direction. In other words, each receiving means is preferably displaced along one of the displacement axes by two preferably superimposed translational movements which are oriented at an angle, preferably at a right angle, to each other.

An embodiment of the method and of the control means of the grouping device according to which during the transfer of the group of products, the receiving means and/or the transfer means are displaced or moved along the conveying section in the conveying direction synchronously with the conveyor belt and the group of products to be transferred conveyed thereon, i.e. at the same speed as the group of products and the conveyor belt in the conveying direction, has proven particularly advantageous in order to avoid positive and negative acceleration, which might have a negative effect on the product transfer process, from the start. The backward movement against the conveying direction after completion of the transfer can be synchronous, but does not have to be. Preferably, after the backward movement, the receiving means and the transfer means, jointly or separately, are resynchronized with the speed of the conveyor belt in the conveying direction so they can then be synchronously displaced in the conveying direction again, i.e. with the same speed as the group of products, for the transfer of the next group of products.

As explained in the beginning, it is envisaged according to the method according to the invention and the device according to the invention is configured in such a manner that after each transfer of a group of products or after the transfer of multiple groups of products, the receiving means are displaced perpendicular to the conveying direction and perpendicular to the transfer direction in order to be able to receive or to receive the next group of products above or below the groups of products already transferred. To this end, the receiving means preferably comprise a receiving unit which has multiple rows of receiving slots or receiving elements disposed next to each other along the conveying direction and each serving to receive a product. In other words, the receiving unit is configured to receive products both next to each other in the conveying direction and one above the other perpendicular to the conveying direction and perpendicular to the transfer direction, which is ensured by the displaceable disposition according to the invention and by the displacement according to the invention of the receiving means perpendicular to the conveying direction and perpendicular to the transfer direction after each transfer of a group of products or after transfer of multiple groups of products. It is preferably envisaged that after being filled, i.e. after a plurality of transfers in which products or groups of products have been transferred one above the other to the receiving unit, the filled receiving unit of the receiving means is replaced, in particular automatically, with an empty receiving unit. There are different options regarding the specific design of the receiving unit. Preferably, it is realized as a pin plate, in particular comprising multiple rows, disposed on above the other, of pins disposed next to each other along the conveying direction. Alternatively, the receiving unit is realized as a clip plate, for example, which has multiple receiving clips or clamps which are preferably disposed in multiple rows disposed one above the other perpendicular to the conveying direction and perpendicular to the transfer direction, the rows, in turn, extending in the conveying direction. As another alternative, the receiving unit can also be realized as a vacuum plate which has a plurality of vacuum slots which are analogously disposed in rows, multiple rows being provided one above the other perpendicular to the conveying direction and perpendicular to the transfer direction.

There are different options with regard to the specific implementation of the actual product transfer from the delivering conveyor to the conveyor belt. In the simplest and preferred case, the delivering conveyor comprises a transport belt having what is referred to as (pivotable) suspended transport vessels, in each of which a product can be received and which can be emptied directly onto the conveyor by being pivoted about a pivoting axis or swing axis. Alternatively, the use of a rotating vacuum drum is possible, for example, by means of which the products are transferred one after the other onto the conveyor belt, in particular into receiving pockets of the conveyor belt, in which case the vacuum drum can again be fed in various ways, such as by means of a conveyor belt or chain pin belt.

The substantial factor in the case of the conveyor belt from which the products are transferred into the receiving means by means of the transfer means is that it is moved, in particular in a straight line, along a conveying section, the conveyor belt being realized as a circulating or endless conveyor belt. The term conveyor belt is to be interpreted broadly and does not necessarily have to comprise a continuous support belt; a design involving individual interconnected circulating pockets whose ends are fixed to a circulating belt or, alternatively, to a chain is possible and preferred, as well.

There also are different options regarding the design of the receiving means. In the simplest case, the receiving means are constituted by what is referred to as a pin plate which has receiving pins which extend perpendicular, preferably horizontal, to the conveying direction and onto which the products of a group of products can be placed, in particular slipped on. However, an alternative embodiment in which the receiving means hold an outer packaging, in particular a cardboard box, and the product units are placed directly into said outer packaging by means of the transfer means is conceivable as well. It is also possible for the receiving means to have a receiving unit for receiving multiple groups of products and for the groups of products gathered in a unit to be fixed relative to each other in the receiving unit, such as by means of fixing tape or by wrapping them in film. It is also possible for the receiving unit to be realized as a clip plate for holding multiple products one above the other and next to each other by clamping, or as a vacuum plate for holding multiple products both one above the other and next to each other by applying a vacuum. Thus, in general, it is preferred that the receiving means have a receiving unit that comprises holding means, in particular in the form of pins, mechanical clips and/or vacuum suckers which are formed and configured to fix and hold a plurality of products or groups of products at once. The receiving unit is configured in such a manner that it can receive products in multiple rows that are disposed one above the other perpendicular to the conveying section and perpendicular to the transfer direction and that extend in the conveying direction.

Likewise, there are different design options with regard to the specific design of the transfer means. In the simplest and preferred case, the transfer means comprise a pusher device which moves multiple products, which form a group of products, from the conveyor belt, in particular from receiving pockets of the conveyor belt, perpendicular to the conveying direction, in particular horizontal to the receiving means. In this case, the receiving means and the transfer means are preferably displaced together with the group of products to be transferred on two sides of the group of products to be transferred, said sides facing away from each other and being spaced apart from each other perpendicular to the conveying direction. It is also conceivable that the transfer means comprise a mechanical gripper and/or a vacuum gripper for transferring the product of a group of products to the receiving means while holding it, said grippers being disposed on a robot arm, for example, which can be controlled accordingly.

Preferably, the conveyor belt comprises vacuum suckers, which are in particular disposed in pockets, for holding and fixing the products by sucking them while they are conveyed in the conveying direction. If required, the vacuum suckers can be configured in such a manner that the vacuum application is reduced as far as to zero, if necessary, during the transfer into the receiving means.

As already indicated, it is particularly advantageous if during a continuous feeding of products by means of the delivering conveyor, the conveyor belt in the conveyor is driven at a speed that has a fixed ratio to the speed of the delivering conveyor in consideration of preferably differing product distances on the delivering conveyor and on the conveyor belt. The speeds of the conveyor belt and of the conveyor are preferably harmonized with the current cycle rate or output speed of a product producing device, in particular a can, tube or cartridge producing device, which is disposed upstream, while at the same time the speeds of the conveyor belt and of the conveyor are harmonized with said upstream production device so as to keep the speed ratio between the conveyor belt and the conveyor the same at all times. This condition is lifted only when gaps are being filled (in which case the conveyor belt will wait for the next product) or if both the conveyor belt and the conveyor have to be stopped because the output speed of the production device drops to zero. In the normal case, i.e. when products are continuously fed by means of the conveyor, the conveyor belt and the conveyor are accelerated and decelerated jointly only (in particular as a function of the output speed of an upstream production device), thus ensuring that products from the conveyor can be placed in each receiving slot on the conveyor belt. Hence, a variation of the speed of the conveyor belt only (and not of the conveyor) is not required, whereby unsmooth running behavior is reliably avoided. The conveyor belt and the conveyor thus behave uniformly and are accelerated or decelerated jointly, in particular as a function of the output rate of an upstream production device, unless the aforementioned exceptions occur.

In an embodiment of the invention, the method according to the invention and the device according to the invention are also particularly suitable for easily closing gaps on the delivering conveyor. Said product gaps are detected by means of suitable sensors, such as a light barrier, and the control means control the drive means in such a manner that the speed of the conveyor belt is reduced as far as to zero, if necessary, but in any case to a speed that is lower than the feeding speed (delivery speed) of the delivering conveyor, the delivering conveyor continuing to be moved, preferably continuously, and the gap following the product gap are placed on the corresponding next receiving slot on the conveyor belt, the conveyor belt running synchronously again with the delivering conveyor once the gap has been closed. In this case, it is preferred for the control means to control the drive means for the transfer means and/or the receiving means simultaneously in such a manner that their speed, too, is reduced when moving in the conveying direction, preferably corresponding to the speed reduction of the conveyor belt, more preferably so as to continue to move in synchronism with the conveyor belt during the closing of the gap as well or to stop analogously to the conveyor belt when the conveyor belt is stopped.

Other advantages, features and details of the invention are apparent from the following description of preferred embodiments and from the drawing.

BRIEF DESCRIPTION OF THE DRAWINGS

In the drawing,
FIG. 1a to
FIG. 8c: show different operating states in a grouping method according to the invention and in a grouping device according to the invention, illustrations A to C each showing different views of the same operating state.

In the figures, identical elements and elements having identical functions are marked by identical reference signs.

DETAILED DESCRIPTION

Hereinafter, first, the basic structure of a grouping device 1 configured according to the concept of the invention will be explained with reference to FIGS. 1a to 1c, and the explanations pertaining to FIGS. 2a to 8c will basically be restricted to changes in state in the course of the different operating states; the basic structure stays the same and all figures show the same device.

Figures 1A, 1B, 1C:
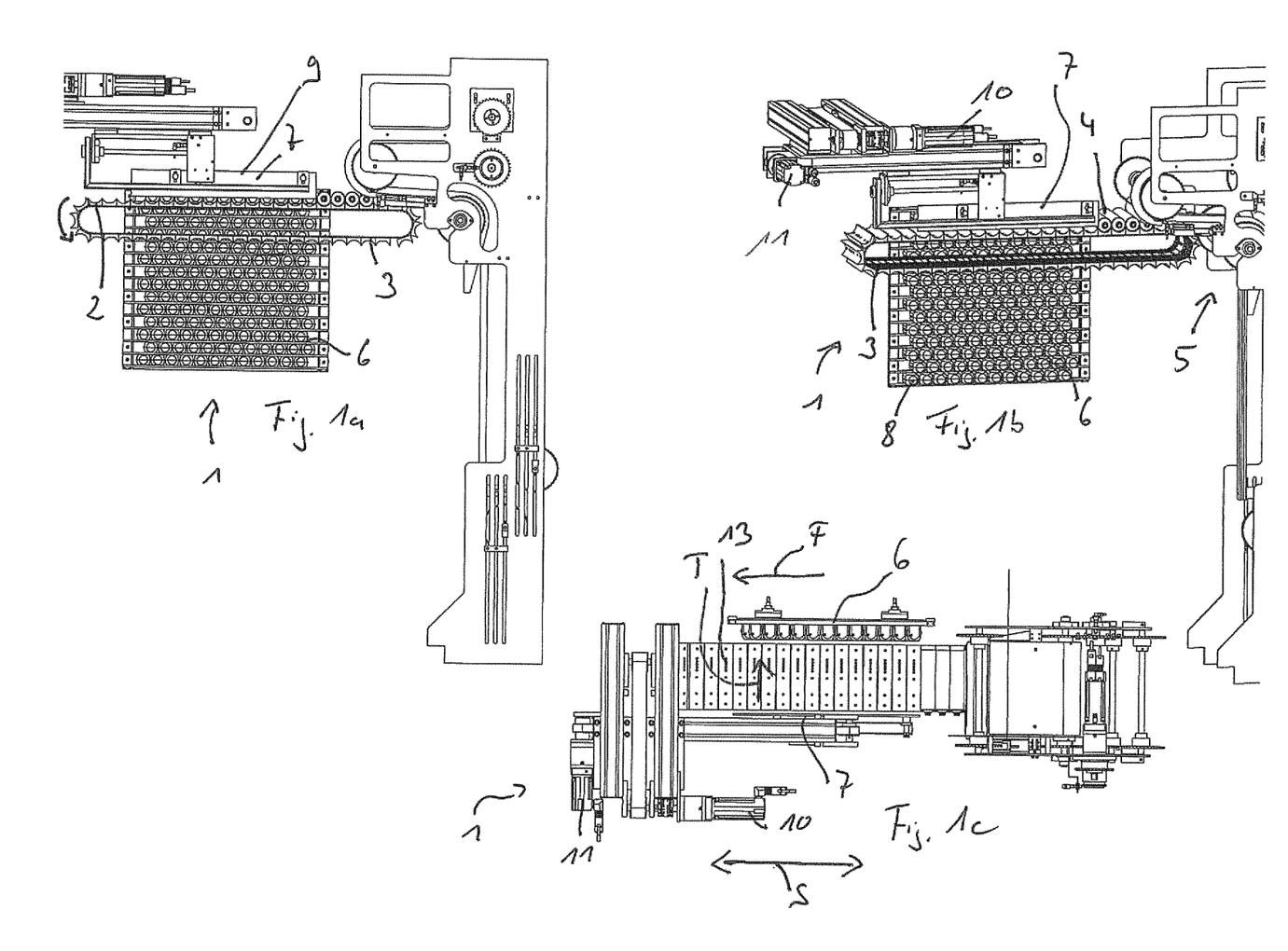

The grouping device 1 has a conveyor belt 3, which is realized as a pocket belt comprising a plurality of pockets 2 disposed one behind the other and each serving to receive a product in the shape of an empty can, an empty tube or an empty cartridge, said conveyor belt 3 being driven by drive means, in particular in the form of at least one servomotor, which are known per se and are not illustrated for the sake of clarity, a top (loading side) of the conveyor belt 3, shown in FIG. 1c, being driven along a straight conveying section S, which is preferably horizontal, for example, in a conveying direction F at a conveying speed defined by the drive means and dictated to the drive means by control means.

Products 4 are placed one after the other on the conveyor belt 3 directly from a delivering conveyor 5 without gap, i.e. without leaving pockets 2 empty. In the specific embodiment, the delivering conveyor 5 is a transport belt having suspended vessels, which are not illustrated for the sake of clarity and which are shown in EP 1 114 784 B1, where they are marked by reference sign 4, said suspended vessels being pivoted about a swing axis and from each of which a product can be unloaded directly into the pocket 2 of the conveyor belt 3 by pivoting the respective element. Suction openings 13 for securely holding the products while they are being conveyed in the conveying direction are visible within the pockets 2. As long as no gaps, i.e. empty suspended transport vessels, are detected on the delivering conveyor 5 in an area upstream of the conveyor belt 3, the conveyor belt 3 is driven in the conveying direction F at a conveying speed that, when products have a given distance from each other on the delivering conveyor 5, ensures that the delivering device places a product in each pocket 2 without having to vary the speed of the conveyor belt 3 independently of the speed of the delivering conveyor 5. In other words, the speed ratio of the speed of the conveyor belt 3 and of the speed of the conveyor 5 is constant (except for an optional gap closing process), the speed of the conveyor belt 3 and the speed of the delivering conveyor 5 being adjusted jointly to a speed (output cycle rate) of an upstream production device. In this way, unnecessary acceleration and deceleration, which would occur if the conveyor 5 was constantly decelerated and accelerated independently of the conveyor belt 3 in order to fill the pockets 2, are safely avoided.

When the products are theoretically spaced apart equally on the conveyor belt 3 and on the delivering conveyor 5, the conveyor belt 3 and the delivering conveyor 5 are consequently operated at the same speed; when the spaces between the products on the delivering conveyor 5 are (preferably) larger than on the conveyor belt 3, the delivering conveyor 5 is operated correspondingly faster than the conveyor belt 3. However, both the conveyor belt 3 and the delivering conveyor 5 are operated at different speeds (>0 m/s), said speeds having a fixed ratio to each other and (except for a potential gap closing process) are changed jointly and simultaneously only, as a function of the aforementioned output cycle rate of an upstream production device.

In any event, the products placed on the conveyor belt 3 are transported in the conveying direction F and, in the specific embodiment, enter the area between receiving means 6 and transfer means 7. In the specific embodiment, the receiving means 6 comprise, merely as an example, a pin plate which has a plurality of pins 8 (receiving pins), which, by way of example, extend horizontally in this case and perpendicular to the conveying direction F in any case and onto each of which a hollow product can be placed. In the embodiment shown, the transfer means 7 comprise a pusher 9 which can be displaced toward the receiving means 6 perpendicular to the conveying direction F in order to transfer a group of products onto the receiving means 6. Once a row of pins extending horizontal in this case, for example, has been filled with products, the receiving means 6 are displaced both perpendicular to the conveying direction F and perpendicular to the transfer direction T, which runs perpendicular thereto, so as to be able to place the next group of products in the row of pins located below in the specific embodiment.

It is substantial that both the receiving means 6 and the transfer means 7 can be displaced not only as described above, but also along the conveying section S in the conveying direction F and in the opposite direction, i.e. in the direction of the delivering conveyor 5, so that they can be moved together with a group of products to be transferred, preferably in synchronism, i.e. with the same speed as the group of products, in the conveying direction F during a transfer and preferably at least for a short time prior to the actual transfer. In this way, it is ensured that the conveying speed of the conveyor belt 3 in the conveying direction F can be controlled independently of the actual transfer and can be harmonized, preferably linearly, with the delivery conveying speed of the delivering conveyor 5, for example, which preferably delivers the products as a function of a production speed of an upstream production device.

In FIG. 1c, multiple drives 10, 11 for driving the transfer means 7 are shown. The electromotor drive, here servomotor drive, marked by reference sign 10 is a displacement drive for displacing the drive means or a pusher plate in the transfer direction T and back, while the drive marked by reference sign 11 is a drive of the drive means for displacing the transfer means 7 along the conveying section S. This is merely an expressly exemplary configuration. The movement can alternatively be executed by means of a corresponding multi-axis robot arm, for example. Drive means for driving the receiving means 6 are not illustrated for the sake of clarity. The receiving means 6 can be displaced as described above. Preferably, corresponding drive means also comprise a drive or a driving shaft for displacing the filled pin plate toward another packaging device, the full pin plate then being replaced with an empty pin plate.

Figure 2A:
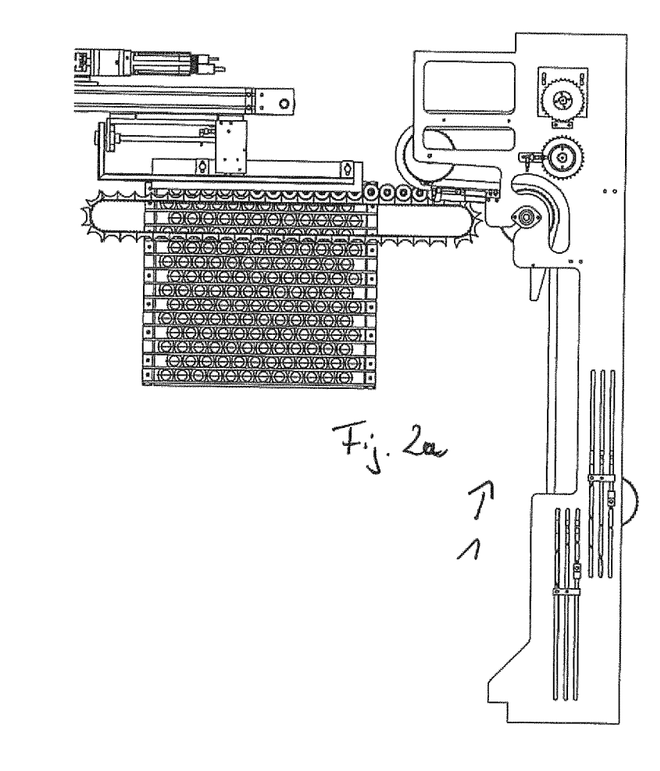
Figures 2B, 2C:
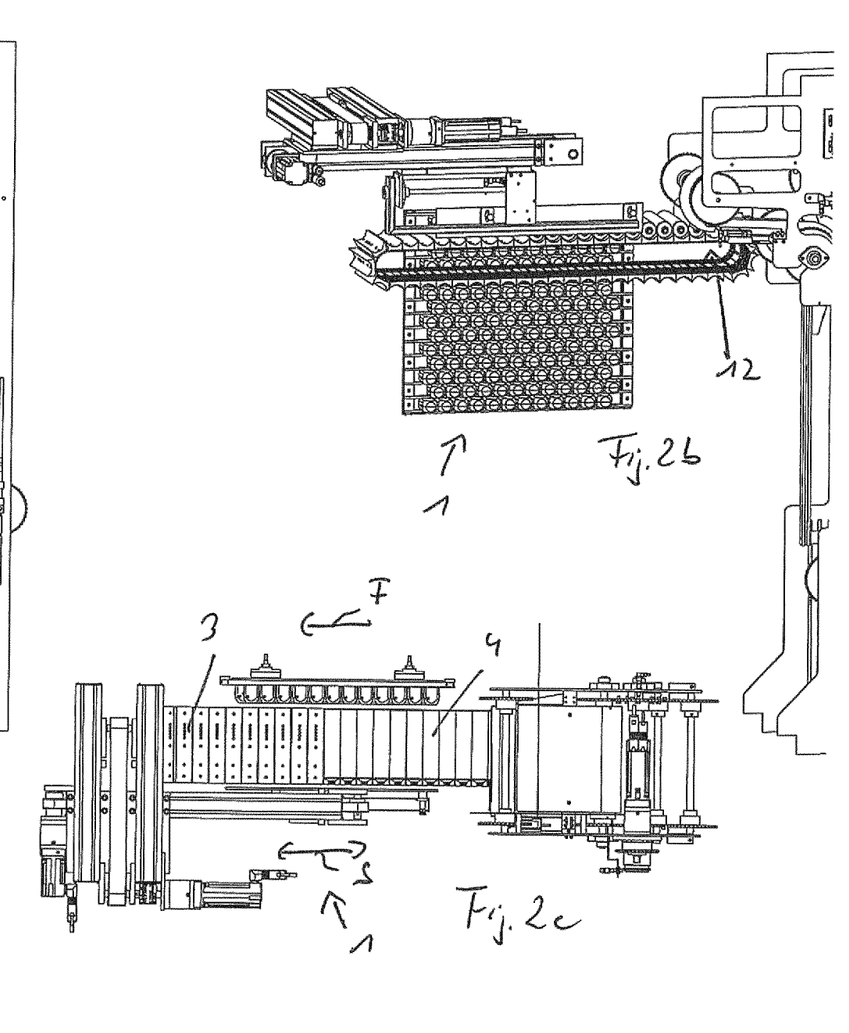
Figures 3B, 3C:
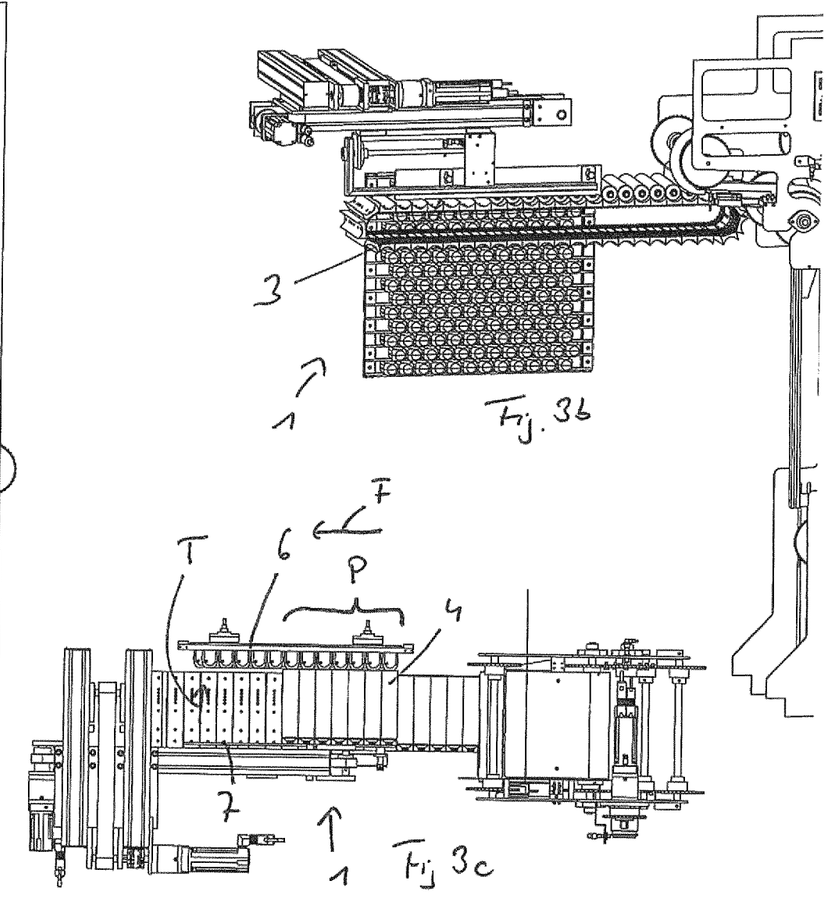
Figure 3D:
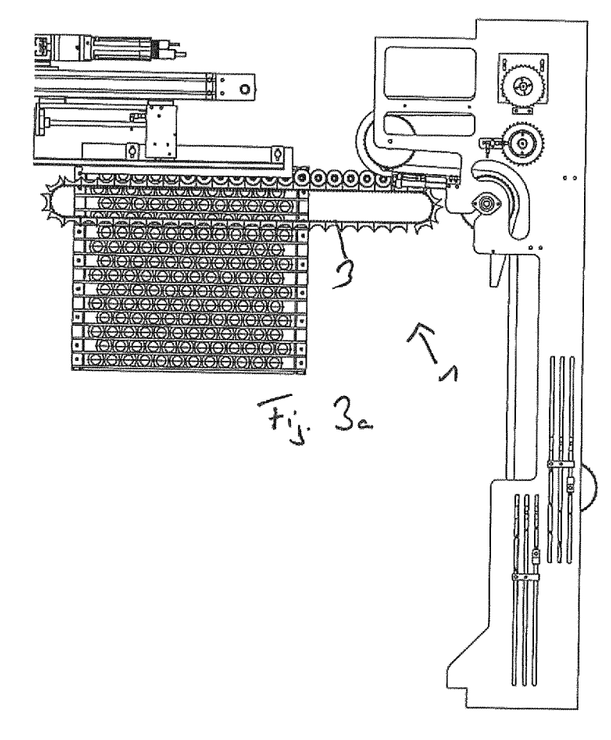

In FIGS. 2a to 2c, it is visible that the products 4 are transferred into an area 12, the transfer in this case taking place, for example, by pivoting corresponding suspended transport vessels, which are not illustrated as stated before. Alternative transfer options, such as of a vacuum drum, can be realized. In the operating state according to FIGS. 2a to 2c, compared to the operating state according to FIGS. 1a to 1c, other products 4 have already been placed on the conveyor belt 3 and transported in the conveying direction F along the conveying section S. Receiving means 6 and transfer means 7 are spaced apart perpendicular to the conveying direction F and located on opposite sides of the products 4. In the operating state according to FIGS. 3a to 3c, an actual transfer process for transferring a group of products P, which, by way of example, comprise seven individual products 4 in the specific embodiment, has already begun. This is evidenced by the fact that the transfer means 7 are already being displaced a little in the transfer direction T toward the receiving means 6. During said transfer, the receiving means 6 and the transfer means 7 move together with the group of products P in the conveying direction F and, in the specific embodiment, they do so in synchronism with the group of products P, i.e. at the same speed as the conveyor belt 3 in the conveying direction F. Synchronization with said conveying speed took place in the operating state or operating stage according to FIGS. 2a to 2c.

Figure 4A:
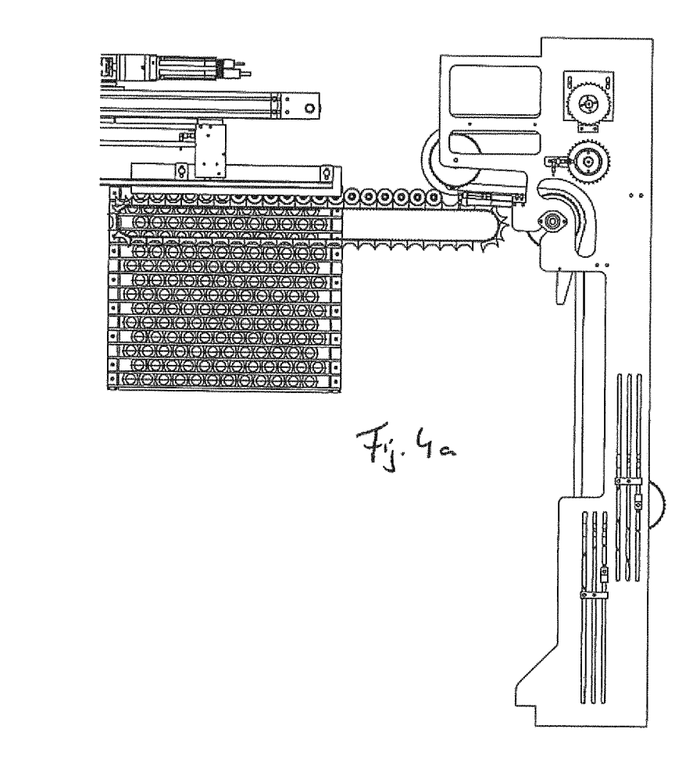
Figures 4B, 4C:
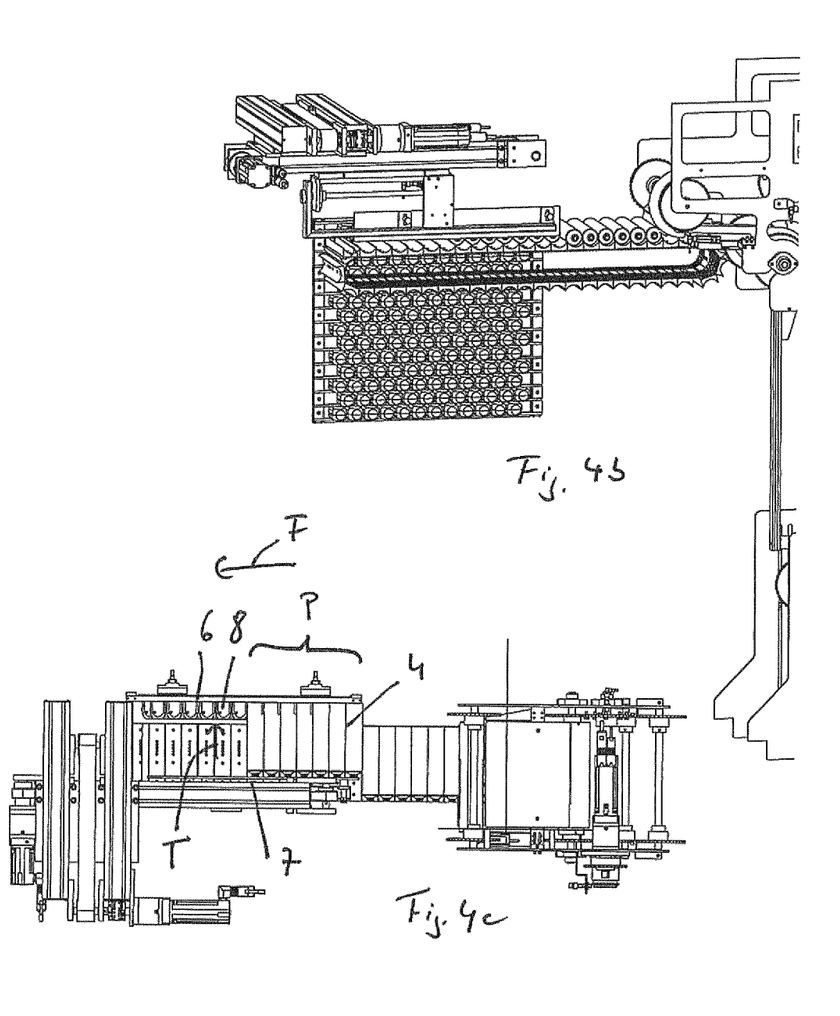

In FIGS. 4a to 4c, the transfer process has progressed further and its completion is imminent. As is visible, compared to the state according to FIGS. 3a to 3c, both the transfer means 7 and the receiving means 6 have been displaced further to the left of the drawing plane, i.e. in the conveying direction F, and the transfer means 7 have simultaneously been displaced further in the transfer direction T toward the receiving means 6. The products 4 of the group of products P have been slipped onto the pins 8 of the exemplarily provided pin plate of the receiving means 6.

Figure 5A:
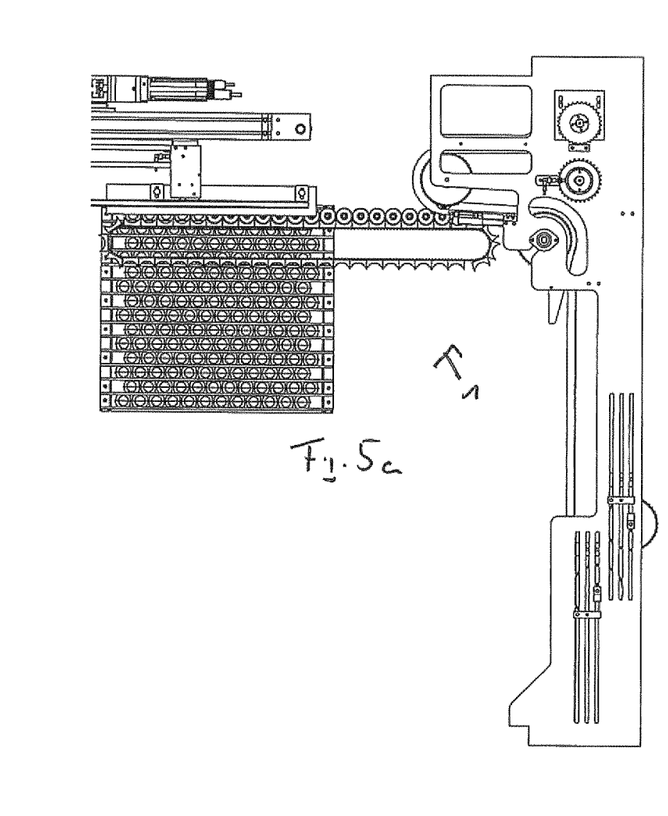
Figures 5B, 5C:
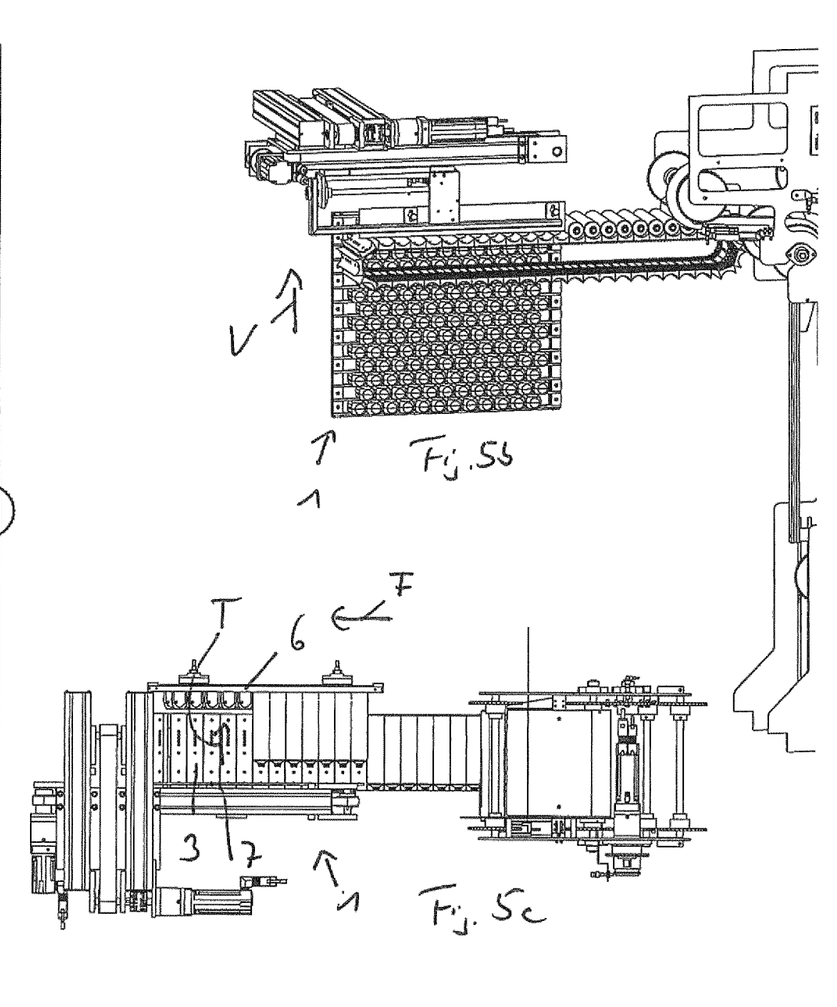

The method step according to FIGS. 5a to 5c follows immediately. As is visible, the transfer means 7, more precisely the exemplarily provided pusher plate, has been displaced backward against the transfer direction perpendicular to the conveying direction F, i.e. downward in the drawing plane of FIG. 5c. During all of these steps, the conveying speed of the conveyor belt 3 does not change.

Figure 6A:
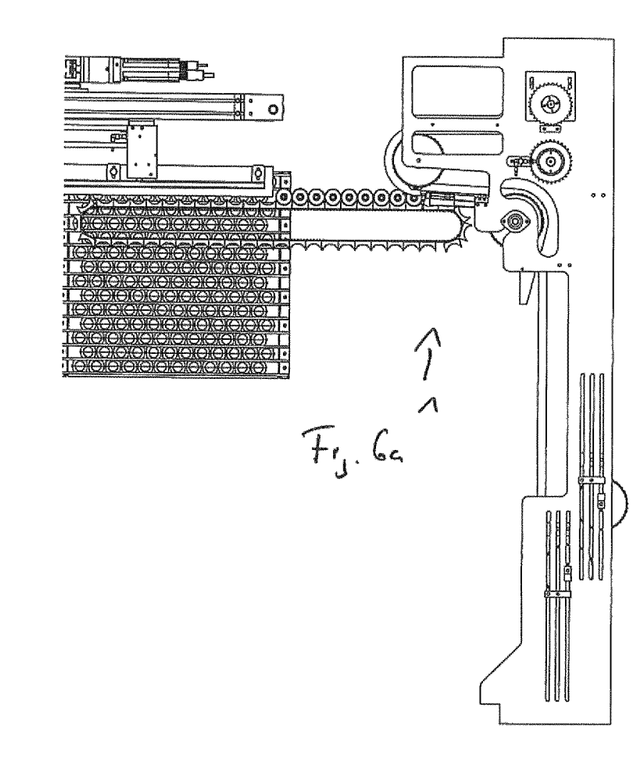
Figures 6B, 6C:
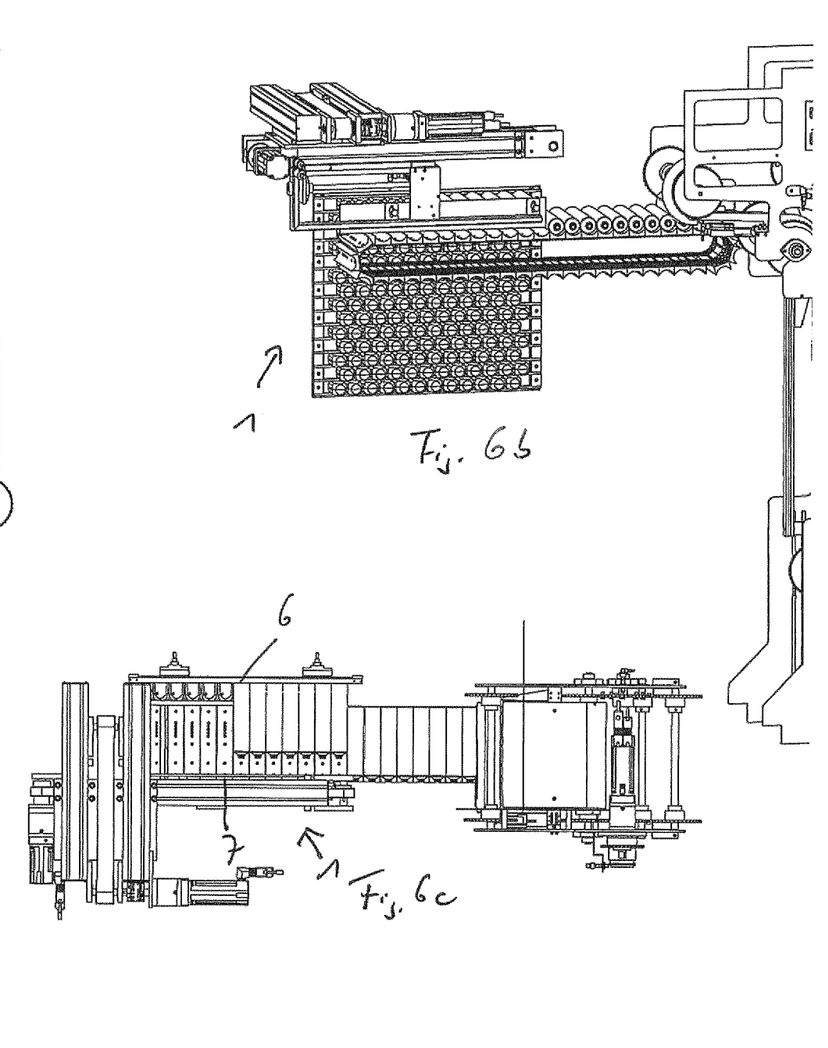
Figures 7B, 7D:
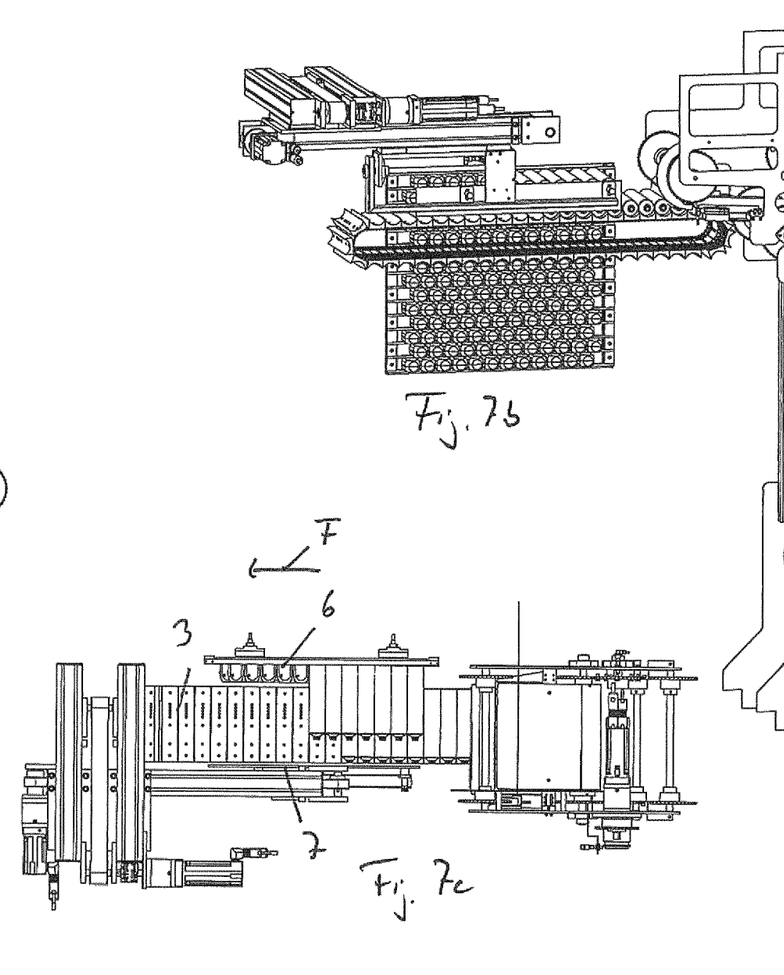
Figure 7C:
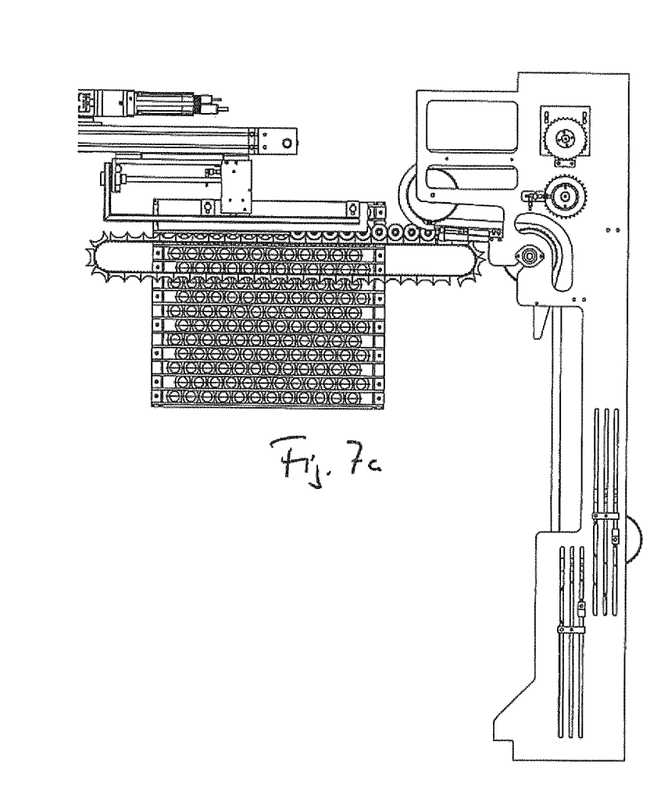
Figure 8A:
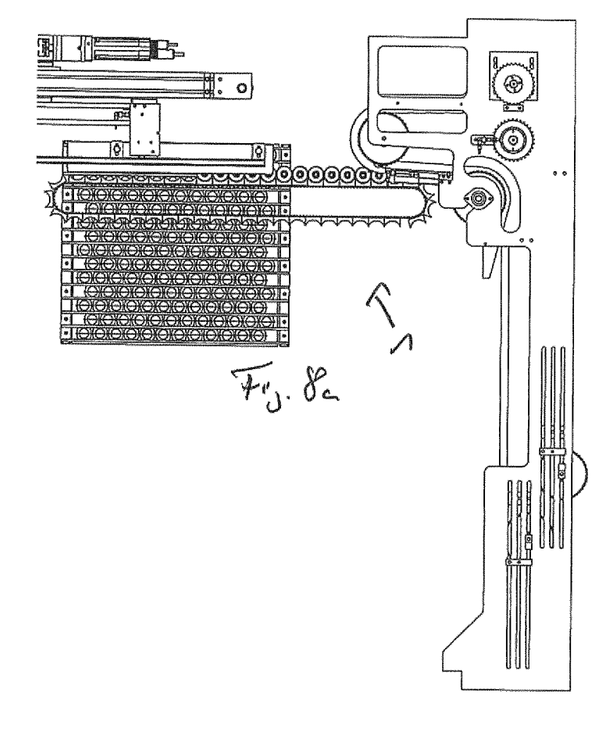
Figures 8B, 8C:
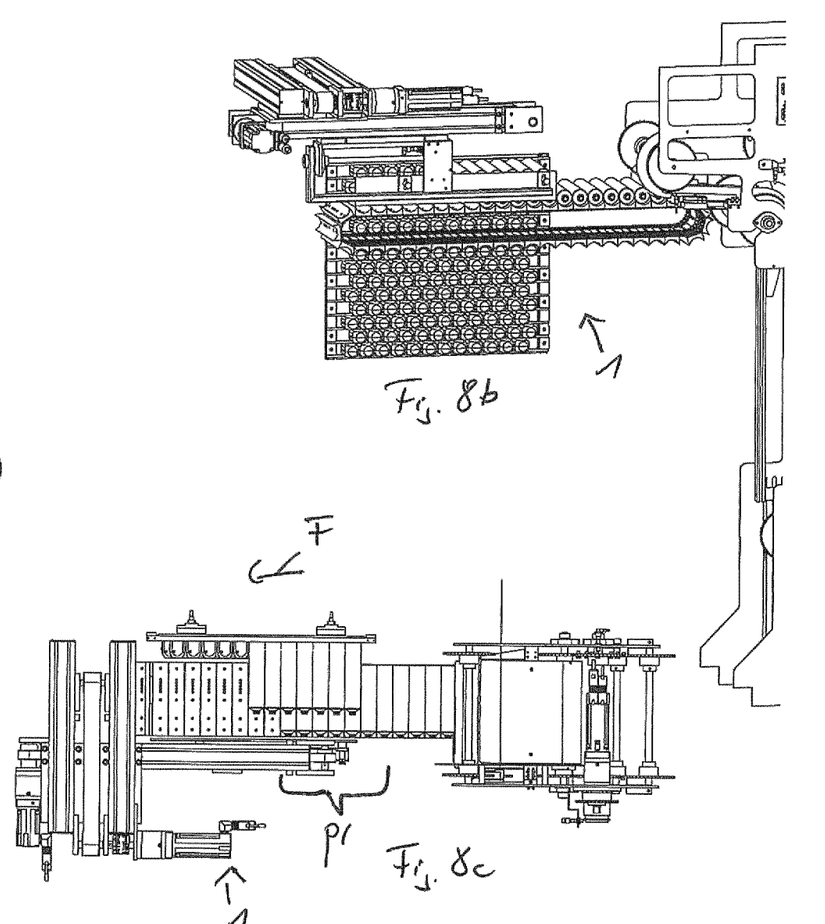

Simultaneous to the backward displacement of the transfer means 7 or delayed by a short time, the receiving means 6 are displaced into the position shown in FIGS. 6a to 6c, namely in a displacement direction V (cf. FIG. 5b), which is oriented perpendicular both to the conveying direction F and to the transfer direction T, in order to be able to load the next pin row, i.e. the pin row located below, during the transfer following now. Simultaneous to said backward displacing movement and/or return movement of the transfer means 7 against the transfer direction T or delayed by a short time, the receiving means 6 and the transfer means 7 are synchronously or, alternatively, asynchronously displaced back against the conveying direction F, namely preferably into an initial position shown in FIGS. 1a to 1c. Here, too, the conveying speed of the conveyor belt 3 does not change. Once another or next full group of products P' is located in an area between the transfer means 7 and the receiving means 6, they are displaced in the conveying direction F again, preferably synchronously with this next group of products P', and said next group of products P' is transferred to the receiving means 6 analogously to the previous description of the transfer of the group of products P, whereupon a backward displacement of the receiving means 6 and of the transfer means 7 against the conveying direction F takes place again.

If a product gap on the delivering conveyor 5 is detected during operation by means of suitable sensor means (not shown), the conveying speed of the conveyor belt 3 is reduced as far as to zero, if necessary, in order to let said gap pass and to fill the pocket 2 to be filled next with the product following the gap. Thereupon, the normal operating state sets in again and the transfer takes place as described above.

REFERENCE SIGNS 1 grouping device
2 pockets
3 conveyor belt
4 products
5 delivering conveyor
6 receiving means
7 transfer means
8 pins
9 pusher
10 drive
11 drive 12 (transfer) area
13 suction openings
F conveying direction
P group of products
P' other group of products
S conveying section
T transfer direction
V displacement direction

The invention claimed is:

1. A method for grouping empty oblong products (4) in the form of cans, tubes or cartridges, comprising the steps of:
   delivering the products (4) from a production line for producing the products (4) to a delivering conveyor (5),
   placing the products (4) from the delivering conveyor (5) on a conveyor belt (3),
   conveying the products (4) on the conveyor belt (3) at a conveying speed along a conveying section (S) in a conveying direction (F), and
   transferring a group of products (P) comprising several of the products (4) from the conveyor belt (3) into receiving means (6) by transfer means (7), the transfer means (7) transferring the group of products (P) by being displaced towards the receiving means (6) in a transfer direction (T) at an angle perpendicular to the conveying direction (F), while simultaneously the transfer means (7) moving with the group of products (P) in the conveying direction (F), displacing the receiving means (6) perpendicular to the conveying direction (F) and perpendicular to the transfer direction (T) after each transfer of a group of products (P) or after the transfer of multiple groups of products (P) so as to be able to receive a next group of products (P) above or below groups of products (P) already transferred,
   wherein
   during the transferring of the group of products (P), both the receiving means (6) and the transfer means (7) are displaced along the conveying section (S) in the conveying direction (F) synchronously with the conveyor belt (3) and with the group of products (P) to be transferred conveyed thereon, and, once transfer is complete, the receiving means (6) and the transfer means (7) are displaced along the conveying section (S) against the conveying direction (F) in order to transfer another group of products (P') into the receiving means (6), and wherein the receiving means is displaceable by means of a robot arm in a reciprocating manner along the conveying direction and perpendicular thereto or, alternatively, along two displacement axes disposed at an angle to each other by two superimposed translational movements oriented at an angle to each other and each taking place along one of the displacement axes.

2. The method according to claim 1,
   wherein
   after being displaced against the conveying direction (F), the transfer means (7) and the receiving means (6) are moved, synchronously, along the conveying section (S) in the conveying direction (F) with said another group of products (P').

3. The method according to claim 1, wherein
   in a receiving unit of the receiving means (6) in the form of a pin plate, a clip plate, or a vacuum plate, products are received next to each other in the conveying direction (F) and one above the other perpendicular to the conveying direction (F) and perpendicular to the transfer direction (T) and wherein after multiple transfers, in each of which the receiving unit has been loaded with a group of products, the receiving unit is replaced with an empty receiving unit.

4. The method according to claim 1, wherein
   the group of products (P) is transferred by pushing and/or wherein the products (4) of the group of products (P) are guided in the transfer direction (T) during the transfer by means of vacuum and/or by being mechanically gripped and/or clamped.

5. The method according to claim 1, wherein
   the delivering conveyor (5) and the conveyor belt (3) are driven at speeds which have a fixed ratio to each other when products are transferred without gap, allowing products (4) to be placed in each receiving position on the conveyor belt (3) while the conveyor (5) and the conveyor belt (3) are driven without the conveyor belt (3) and the conveyor (5) being accelerated or decelerated independently of each other.

6. The method according to claim 1, wherein
   the receiving means are displaced along the conveying section (S) and perpendicular to the conveying section (S) and perpendicular to the transfer direction (T) by means of a robot arm or each translationally along two displacement axes that run at an angle perpendicular to each other.

7. The method according to claim 1, wherein
   with the aid of sensor means, product gaps on the delivering conveyor (5) are detected and the speed of the conveyor belt (3) and of the transfer means (7) and receiving means (6) moved therewith is reduced as far as to zero, in order to close the product gaps with a following product (4).

8. A grouping device (1) for grouping oblong products (4) in the form of cans, tubes or cartridges, configured to carry out a grouping method according to claim 1, comprising:
   a delivering conveyor (5) for the products (4),
   a circulating conveyor belt (3) for conveying the products (4) along a conveying section (S) in a conveying direction (F),
   transfer means (7) for transferring a group of products (P) from the conveyor belt (3) into receiving means (6),
   drive means, and control means for controlling the drive means, the control means being configured to control the drive means in such a manner that in order to transfer the products (4), the transfer means (7) are displaced toward the receiving means (6) in a transfer direction (T) at an angle perpendicular to the conveying direction (F) while moving with the group of products (P) in the conveying direction (F) and in such a manner that after each transfer of a group of products (P) or after the transfer of multiple groups of products (P), the receiving means (6) are displaced perpendicular to the conveying direction (F) and perpendicular to the transfer direction (T) so as to be able to receive the following group of products (P) above or below the groups of products (P) already transferred,
   wherein
   the control means are configured to control the drive means in such a manner that during the transfer of the group of products (P), both the receiving means (6) and the transfer means (7) are displaced synchronously with the conveyor belt (3) and the group of products (P) to be transferred conveyed thereon, along the conveying section (S) in the conveying direction (F) and, once the transfer is complete, the receiving means (6) and the transfer means (7) are displaced along the conveying section (S) against the conveying direction (F) in order to transfer another group of products (P') into the receiving means (6), and the receiving means is displaceable by means of a robot arm in a reciprocating manner along the conveying direction and perpendicular thereto or, alternatively, along two displacement axes disposed at an angle to each other by two superimposed translational movements oriented at an angle to each other and each taking place along one of the displacement axes.

9. The grouping device according to claim 8, wherein the conveyor belt (3) is configured as a pocket belt comprising pockets (2) which have vacuum suckers and serve to receive exactly one product (4) each.

10. The grouping device according to claim 8, wherein the transfer means (7) are configured as pushing means for transferring the group of products (P, P') into the receiving means (6) by pushing and/or have vacuum suckers and/or mechanical grippers and/or clamping means for transferring the group of products (8) into the receiving means (6) in a guided manner.

11. The grouping device according to claim 8, further comprising
sensor means that are signal-connected to the control means and serve to detect product gaps on the delivering conveyor (5), wherein the control means are configured in such a manner that when a product gap is detected, they control the drive means in such a manner that the speed of the conveyor belt (3) and of the transfer means (7) and of the receiving means (6) moved synchronously therewith is reduced to a speed that is lower than a delivery speed of the delivering conveyor (5) as far as to zero, in order to close the product gaps with a following product (4).

12. The grouping device according to claim 8, wherein the receiving means (6) comprise a pin plate and/or a clip plate and/or a vacuum-sucker plate and/or an outer-packaging holding device for holding an outer packaging for transferring the group of products (P) directly into the outer packaging by means of the transfer means (7) and/or a bundling device for bundling a plurality of transferred groups of products (P).

13. The grouping device according to claim 8, wherein the delivering conveyor (5) comprises a vacuum drum by means of which the products (4) can be placed directly on the conveyor belt (3) in pockets (2), or wherein the delivering conveyor (5) comprises a transport belt which has pivotable suspended transport vessels and from which the products (4) are placed directly on the conveyor belt (3) by pivoting the suspended transport vessels.

14. A system comprising a grouping device according to claim 8 and a production device for producing the products (4) to be grouped and for supplying the delivering conveyor (5) with said products (4).

* * * * *